UNITED STATES PATENT OFFICE.

LUDWIG A. THIELE, OF UPPER SANDUSKY, OHIO.

NUCLEIN-ARSENIC COMPOUNDS AND PROCESS OF PREPARING SAME.

1,197,971.

Specification of Letters Patent. Patented Sept. 12, 1916.

No Drawing. Application filed June 4, 1914. Serial No. 842,897.

*To all whom it may concern:*

Be it known that I, LUDWIG A. THIELE, a citizen of the United States of America, residing at Upper Sandusky, in the county of Wyandot and State of Ohio, have invented certain new and useful Improvements in Nuclein-Arsenic Compounds and Processes of Preparing Same; and I do hereby declare the following to be a full, clear, and exact description of the invention, such as will enable others skilled in the art to which it appertains to make and use the same.

My invention relates to a new and useful composition of matter, and its object is to provide a chemical compound having various new and useful qualities and particularly adapted as a specific remedy for the curing of diseases of animals and for various other purposes. I have discovered that hitherto unknown nuclein-arsenic compounds can be obtained, for instance, by treating nucleinic acids with arsenic salts in the presence of phenol, its salts or derivatives.

The procedure for producing the aforesaid new compounds is illustrated by the following example, to wit:—Take 1.28 kilo of nucleinic acid of either animal or vegetable origin and dissolve the same in 10 liters of water containing 10% strength of sodium-phenate. To this solution 900 grams of sodium-cacodylate are added and the mixture evaporated until dry with constant stirring. The result is a pale yellow powder which is then dissolved in boiling water to form a saturated solution from which upon cooling, a nuclein-arsenic compound will be precipitated in the form of crystalline needles. This new product is soluble in water, alkalis, and in alkali metal carbonates. When heated, this compound assumes a dark color at 180° C., and decomposes on further heating. The alkaline solutions of this new compound are altered on exposure to air and by light. This new nuclein-arsenic compound is found to be a specific for the cure of cholera suis (hog cholera), febris recurrens, and like diseases of animals, and also very effective for immunizing various animals exposed to such diseases. The therapeutic efficiency of the above nuclein-arsenic compounds, consists in the quality of acting upon *Bac. choleræ suis*. and its associates, and neutralizing the toxins produced by the aforesaid bacilli.

The said new compound may be practically administered by injecting a solution of the same of 8% to 15% strength in the subcutaneous connective tissue. Administration "per os" is excluded. According to present experience, it is best to administer doses of one-tenth grain per pound of body weight, which may be eventually repeated from time to time, as indicated by the symptoms.

What I claim is:—

1. The process of preparing nuclein-arsenic compounds which comprises reacting between a nucleinic acid and an arsenic salt in the presence of a phenylic compound.

2. The process of preparing nuclein-arsenic compounds which comprises treating a mixture of a phenylic compound and a compound comprising a nucleinic acid radical, with a soluble compound of arsenic.

3. The process of preparing nuclein-arsenic compounds which comprises dissolving a nucleinic acid in an aqueous solution of an alkali phenate, admixing therewith a soluble cacodylate and treating the mixture under suitable reacting conditions to obtain the desired nuclein-arsenic compound.

4. A nuclein-arsenic compound comprising arsenic in combination with a nucleinic acid, said compound being soluble in water and alkaline solutions, darkening when heated to about 180° C. and decomposing above that temperature, and possessing valuable therapeutic properties.

In testimony whereof I affix my signature in presence of two witnesses.

LUDWIG A. THIELE.

Witnesses:
W. M. SMALLEY,
C. D. HARE.